United States Patent
Wilber

(10) Patent No.: US 10,344,618 B2
(45) Date of Patent: Jul. 9, 2019

(54) IMPINGEMENT STRUCTURE FOR JET ENGINE MID-TURBINE FRAME

(71) Applicant: United Technologies Corporation, Hartford, CT (US)

(72) Inventor: John E. Wilber, East Hampton, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 273 days.

(21) Appl. No.: 15/032,019

(22) PCT Filed: Jan. 23, 2015

(86) PCT No.: PCT/US2015/012656
§ 371 (c)(1),
(2) Date: Apr. 25, 2016

(87) PCT Pub. No.: WO2015/116494
PCT Pub. Date: Aug. 6, 2015

(65) Prior Publication Data
US 2017/0044932 A1 Feb. 16, 2017

Related U.S. Application Data

(60) Provisional application No. 61/932,482, filed on Jan. 28, 2014.

(51) Int. Cl.
*F01D 25/12* (2006.01)
*F01D 25/28* (2006.01)
(Continued)

(52) U.S. Cl.
CPC ............. *F01D 25/12* (2013.01); *F01D 9/065* (2013.01); *F01D 25/162* (2013.01); *F01D 25/28* (2013.01);
(Continued)

(58) Field of Classification Search
CPC ........ F01D 25/12; F01D 25/162; F01D 25/28; F01D 9/041; F05D 2220/32;
(Continued)

(56) References Cited

U.S. PATENT DOCUMENTS

| | | |
|---|---|---|
| 4,013,376 A | 3/1977 | Bisson et al. |
| 4,920,742 A | 5/1990 | Nash et al. |

(Continued)

OTHER PUBLICATIONS

International Search Report and Written Opinion dated Apr. 14, 2015 in Application No. PCT/US2015/012656.
(Continued)

*Primary Examiner* — Carlos A Rivera
*Assistant Examiner* — Eric J Zamora Alvarez
(74) *Attorney, Agent, or Firm* — Snell & Wilmer, L.L.P.

(57) ABSTRACT

A mid-turbine frame ("MTF") for a jet engine is disclosed and comprises a duct that extends between a high pressure turbine ("HPT") and a low pressure turbine ("LPT"), the duct comprising a plurality of segments that together form an outer annular structure and an inner annular structure, the inner annular structure situated radially inward of the outer annular structure, and/or a plurality of vanes that extend radially outward from the inner annular structure toward the outer annular structure, each vane comprising a channel. Each segment may be coupled to an adjacent segment by a seal.

13 Claims, 8 Drawing Sheets

(51) Int. Cl.
*F01D 9/06* (2006.01)
*F01D 25/16* (2006.01)

(52) U.S. Cl.
CPC ...... *F05D 2220/32* (2013.01); *F05D 2240/12* (2013.01); *F05D 2240/55* (2013.01); *F05D 2260/201* (2013.01); *F05D 2300/17* (2013.01); *Y02T 50/676* (2013.01)

(58) Field of Classification Search
CPC ............. F05D 2240/12; F05D 2240/55; F05D 2260/201; F05D 2300/17; F05D 2240/81; Y02T 50/676
See application file for complete search history.

(56) References Cited

U.S. PATENT DOCUMENTS

| | | | |
|---|---|---|---|
| 4,987,736 A * | 1/1991 | Ciokajlo | F01D 9/065 415/138 |
| 5,292,227 A * | 3/1994 | Czachor | F01D 25/162 415/142 |
| 5,344,283 A | 9/1994 | Magowan et al. | |
| 5,743,708 A | 4/1998 | Cunha et al. | |
| 6,261,053 B1 * | 7/2001 | Anderson | F01D 5/08 415/115 |
| 6,705,832 B2 * | 3/2004 | Tiemann | F01D 5/22 277/630 |
| 8,069,648 B2 * | 12/2011 | Snyder | F01D 25/30 60/226.1 |
| 8,359,866 B2 * | 1/2013 | Dierberger | F23M 5/02 60/752 |
| 8,490,399 B2 * | 7/2013 | Nordlund | F23R 3/005 60/752 |
| 8,500,392 B2 * | 8/2013 | Durocher | F01D 9/06 415/116 |
| 9,534,783 B2 * | 1/2017 | Dierberger | |
| 2011/0002778 A1 * | 1/2011 | Strom | F01D 9/04 415/182.1 |
| 2011/0185740 A1 * | 8/2011 | Dierberger | F23M 5/02 60/755 |
| 2013/0084166 A1 * | 4/2013 | Klingels | F01D 11/005 415/173.1 |

OTHER PUBLICATIONS

International Preliminary Report on Patentability dated Aug. 2, 2016 in Application No. PCT/US2015/012656.

* cited by examiner

IMPINGEMENT STRUCTURE FOR JET ENGINE MID-TURBINE FRAME

CROSS-REFERENCE TO RELATED APPLICATIONS

This application is U.S. national phase filing under 35 U.S.C. § 371 of PCT/US2015/012656 filed on Jan. 23, 2015 and entitled "IMPINGEMENT STRUCTURE FOR JET ENGINE MID-TURBINE FRAME," which claims priority from U.S. Provisional Application No. 61/932,482 filed on Jan. 28, 2014 and entitled "IMPINGEMENT STRUCTURE FOR JET ENGINE MID-TURBINE FRAME." Both of the aforementioned applications are incorporated herein by reference in their entirety.

FIELD

The present disclosure relates to an impingement structure for a jet engine mid-turbine frame, and more particularly, to an impingement structure, also referred to as a perforated structure, for a jet engine mid-turbine frame vane segment.

BACKGROUND

Gas turbine engines (e.g., jet engines) generally include a compressor to pressurize inflowing air, a combustor to burn a fuel in the presence of the pressurized air, and a turbine to extract energy from the resulting combustion gases. The compressor may comprise a low pressure compressor, as well as a high pressure compressor. The turbine may likewise comprise a high pressure turbine and a low pressure turbine.

SUMMARY

An apparatus is provided comprising a radially inward segment portion, a radially outward segment portion, and a radially outward perforated structure coupled to the radially outward segment portion.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
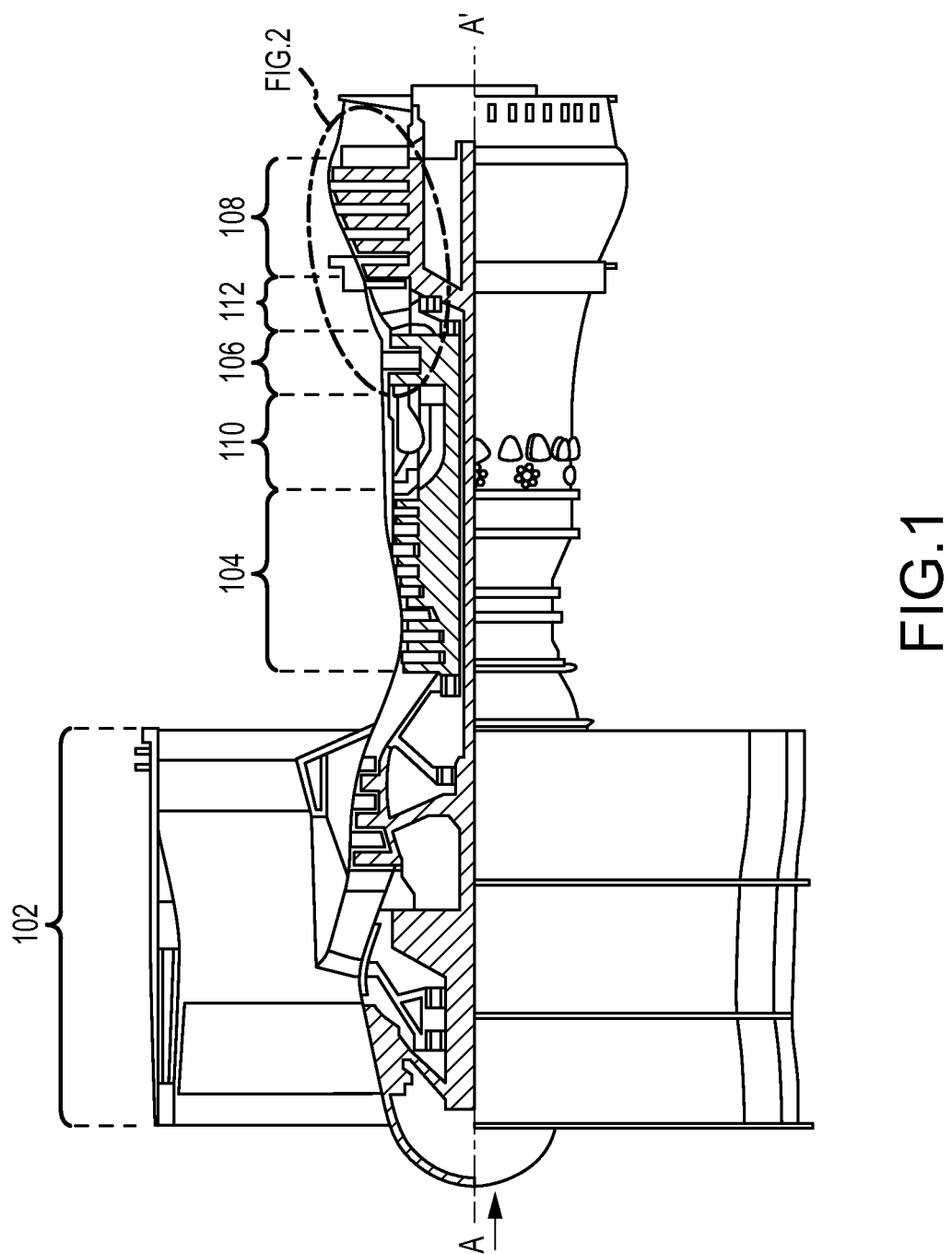
FIG. 1 illustrates, in accordance with various embodiments, a cutaway view of a jet engine.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion. For example, with reference to FIG. 1, central axis A-A' may be described as extending from a forward position (A) to an aft position (A').

A gas turbine engine may comprise a high pressure turbine and a low pressure turbine. Hot gas from a combustion section of a gas turbine engine may flow into the high pressure turbine and the low pressure turbine, in that order, from forward to aft. The kinetic energy of the hot gas is captured by the high pressure turbine and the low pressure turbine and converted into more other useful forms of energy. High pressure turbines tend to operate at maximum efficiency when the gas is hot and the high pressure turbine is small. Low pressure turbines tend to work at maximum efficiency when the hot gases operate at the low pressure turbine's largest diameter. Thus, for improved efficiency, there may be a large difference in the diameter between a high pressure turbine and a low pressure turbine. Conventionally, the forward stages of the low pressure turbine were not as efficient as they could be. However, by using or coupling a mid-turbine frame between the high pressure turbine and the low pressure turbine, the hot gases may rapidly expand as they exit the high pressure turbine to gain a large diameter upon entry into the forward stages of the low pressure turbine. For further information, U.S. Provisional Patent Application Ser. No. 61/925,001 is hereby incorporated by reference in its entirety.

A mid-turbine frame may thus be disposed between a high pressure turbine and a low pressure turbine. As hot gases leave the high pressure turbine, heat may be transferred to the mid-turbine frame, or, more specifically, the components that make up the mid-turbine frame. Certain structures of the mid-turbine frame may be designed to thermally and/or mechanically protect high temperature intolerant components, such as, for example, support struts, air and oil service lines, and the like. Though various structural configurations and material selection may enhance the thermal and/or mechanical protection, it may also be advantageous to allow cooler air from other gas turbine engine locations to enter a mid-turbine frame and cool (i.e., transfer heat away from) the mid-turbine frame. In various embodiments, cooling air is conducted into one or more vanes to cool one or more high temperature intolerant components and/or one or more vanes. Cooling air flow, however, is advantageously be modulated. Thus, the incorporation of specialized structures in a mid-turbine frame may be beneficial to cooling.

With reference now to FIG. 1, gas turbine engines (e.g., jet engines) 100 may extend from forward to aft along a central axis A-A'. As described above, gas turbine engines 100 generally include a compressor to pressurize inflowing air, a combustor to burn a fuel in the presence of the pressurized air, and a turbine to extract energy from the resulting combustion gases. The compressor may be divided into two sections. Specifically, the compressor may comprise a low pressure compressor 102 situated forward of a high pressure compressor 104. The turbine may likewise be divided into two sections. These include a high pressure turbine (or "HPT") 106 situated forward of a low pressure turbine (or "LPT") 108. The combustor 110 may be disposed axially aft of the HPT 106 and axially forward of the LPT 108.

Figure 2:
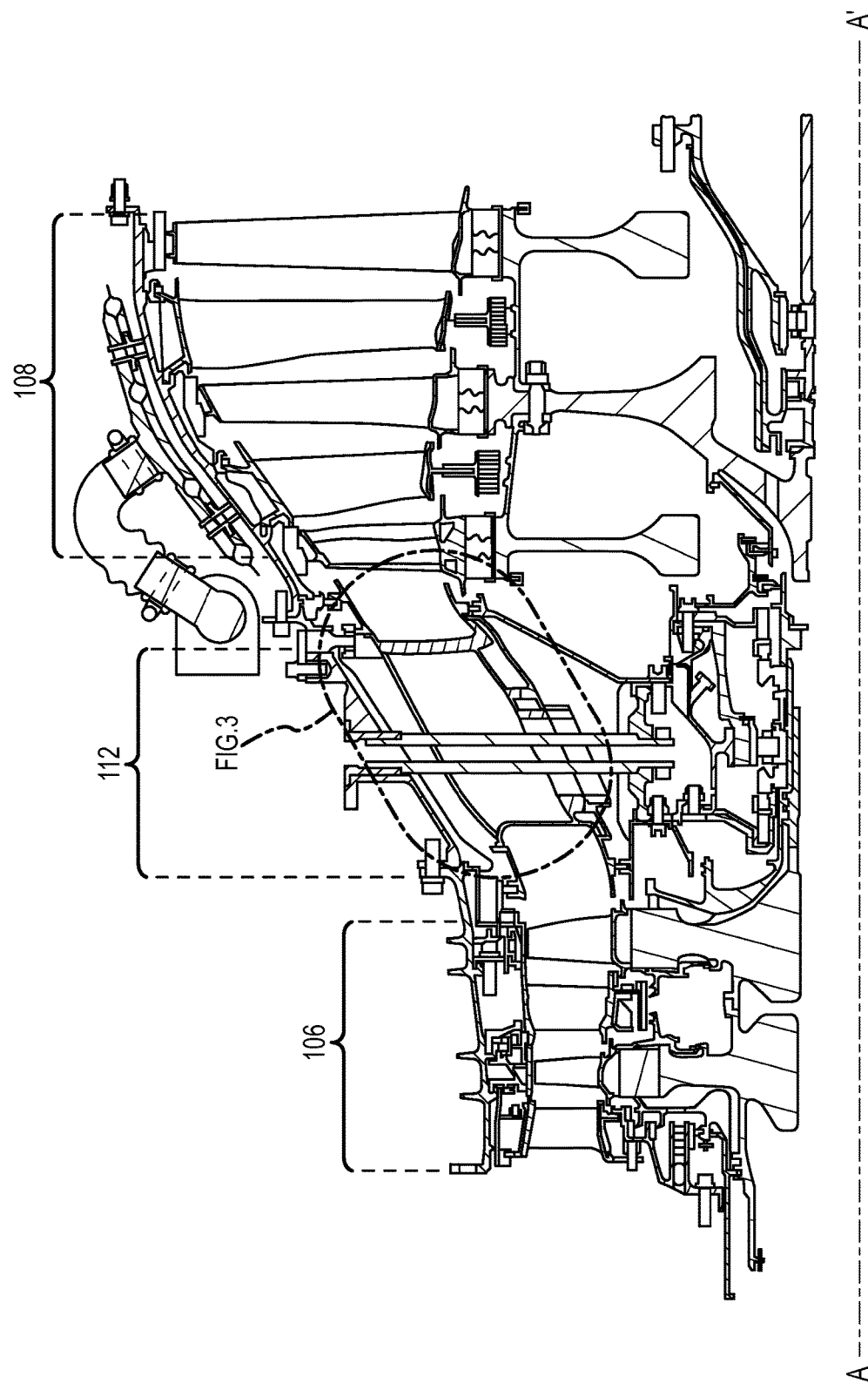
FIG. 2 illustrates, in accordance with various embodiments, a cross-sectional view of portion of a jet engine turbine.

In various embodiments, a structure, which may be referred to herein as a "mid-turbine frame" or "MTF" 112 may be included as part of the gas turbine engine 100. More particularly, as shown with respect to FIG. 2, the MTF 112 may be disposed aft of the HPT 106 and forward of the LPT 108. The MTF 112 may generally comprise a duct configured to convey (hot) combustion gasses from the HPT 106 to the LPT 108. The MTF 112 may thus comprise an annular and/or semi-annular duct configured, in particular, to permit the expansion of hot gasses exiting the HPT 106 into the LPT 108. The MTF 112 may enlarge in diameter as it extends from forward to aft along the central axis A-A'.

Figure 3:
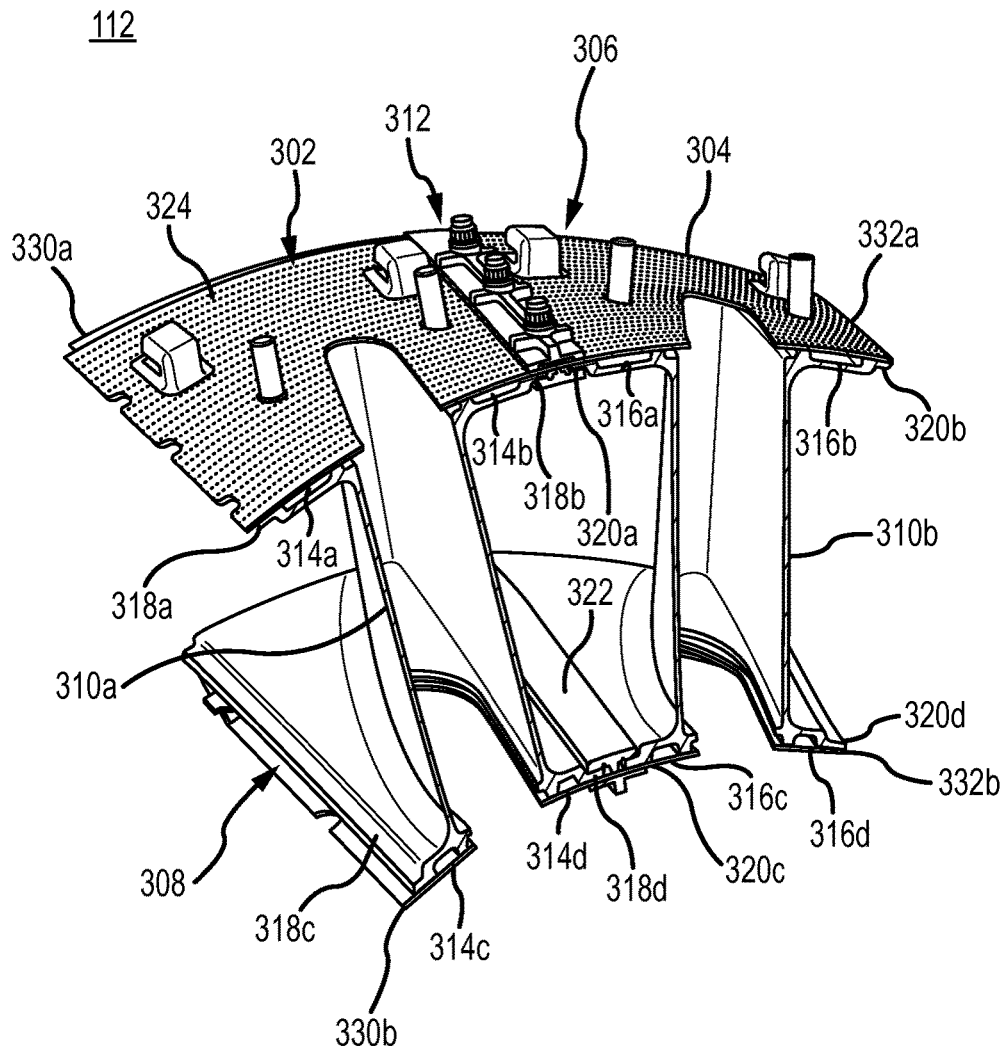
FIG. 3 illustrates, in accordance with various embodiments, a cutaway view of a MTF.

With reference to FIG. 3, the MTF 112 may more particularly comprise a plurality of segments (e.g., to illustrate a portion of an MTF 112, a first segment 302 and second segment 304) that together form an MTF 112. For example, and again, to illustrate a portion of an MTF 112, the first segment 302 and the second segment 304 may comprise radially outer arcing surfaces and radially inner arcing surfaces that may be joined or sealed, as described herein, to form an outer annular structure 306 and an inner annular structure 308 of an MTF 112. Stated another way, first segment 302 and second segment 304 comprise arc segments that, when coupled, form outer annular structure 306 and inner annular structure 308, wherein outer annular structure 306 is radially farther from central axis A-A' than inner annular structure 308. Specifically, the first segment 302 may comprise an outer arcing surface 330a and an inner arcing surface 330b, while the second segment 304 may comprise an outer arcing surface 332a and an inner arcing surface 332b. The inner annular structure 308 may be situated radially inward of the outer annular structure 306, where the radially inward indicates closer proximity to central axis A-A'.

The MTF 112 may further comprise a plurality of vanes (e.g., 310a and 310b) that extend radially outward from the inner annular structure 308 toward the outer annular structure 306. Each vane may comprise a channel that houses a variety of components (e.g., support struts, hydraulic and electrical equipment, and the like). In various embodiments, any number of vanes may be used in the construction of an MTF 112 (e.g., 9 vanes, 18 vanes, and the like).

It may be understood that in a gas turbine engine, various components are supported by support structures such as support struts and the like. Moreover, air and oil service lines may be along the radius of central axis A-A' to serve various radially inward components. However, as MTF 112 is situated aft of HPT 106 and is configured to receive hot gases from HPT 106, support struts, air and oil service lines, and the like would be impaired or destroyed by hot gases from HPT 106. In various embodiments, hot gases from HPT 106 are above 900° F. Accordingly, a plurality of vanes (e.g., 310a and 310b) may be configured to both shield high temperature intolerant components from hot gases while also imposing minimal or near minimal aerodynamic resistance.

In various embodiments, each of the segments (e.g., 302 and 304) comprising the outer annular structure 306 and/or the inner annular structure 308 may comprise a plurality of channels (e.g., 314a, 314b, 314c, 314d, 316a, 316b, 316c, 316d) that extend axially along an axial length each of the segments.

Each segment (e.g., 302 and 304) comprising the outer annular structure 306 and the inner annular structure 308 may include a plurality of tenons that define axial terminuses of each segment 302 and 304. For example, the first segment 302 may include a first and second tenon (e.g., 318a and 318b) that define a first and second outer axial terminus of the first segment 302 and a third and fourth tenon (e.g., 318c and 318d) that define a third and fourth inner axial terminus of the first segment 302.

The same may be true with respect to the second segment 304. For example, the second segment 304 may include a first and second tenon (e.g., 320a and 320b) that define a first and second outer axial terminus of the second segment 304. Likewise, the second segment 304 may include a third and fourth tenon (e.g., 320c and 320d) that define a third and fourth inner axial terminus of the second segment.

Figure 4:
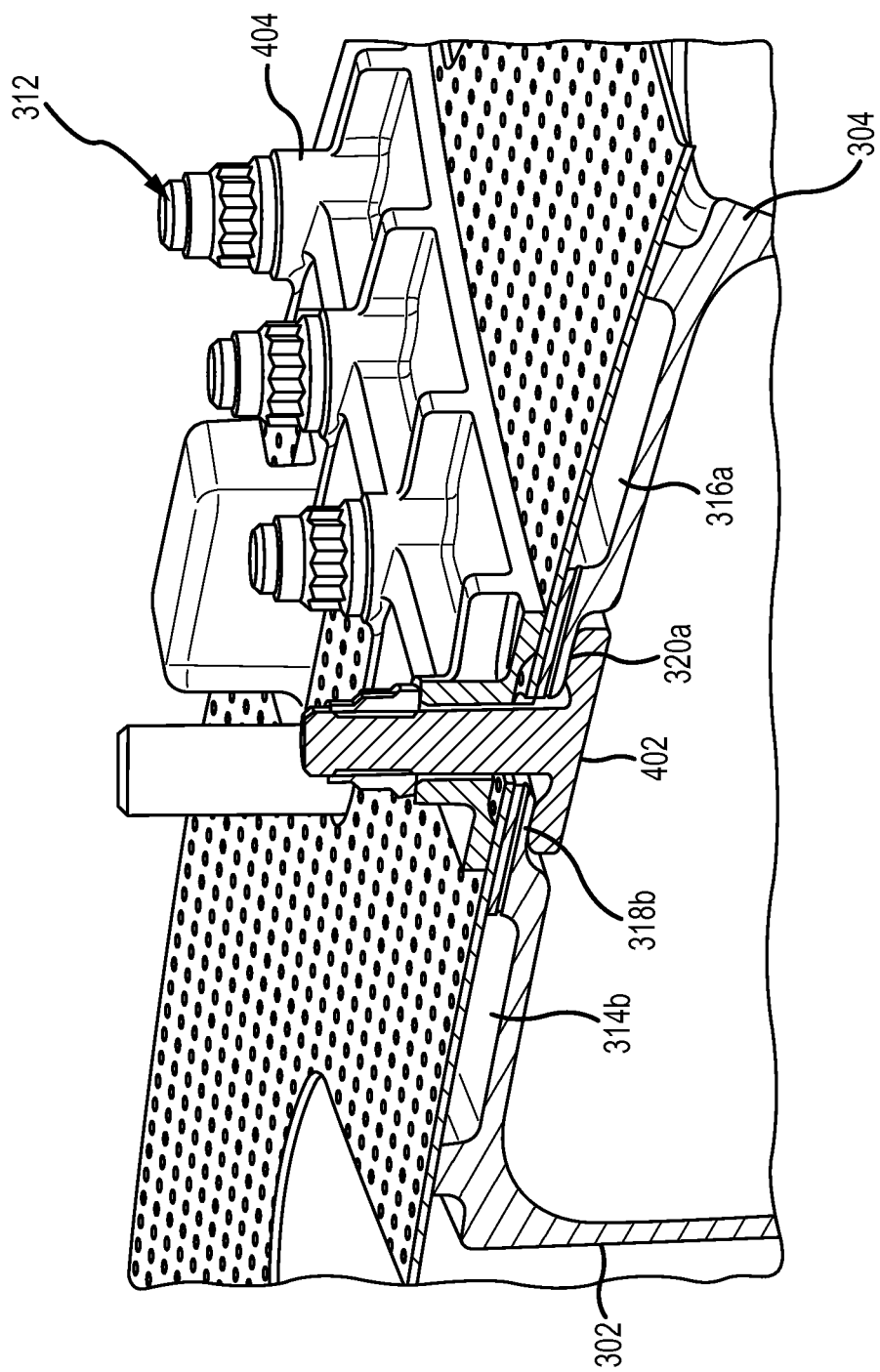
FIG. 4 illustrates, in accordance with various embodiments, a cutaway view of an outer annular structure of an MTF.

In various embodiments, each segment (e.g., 302 and 304) comprising the MTF 112 may be coupled to an adjacent segment by a seal 312 and/or 322. For example, with reference to FIG. 4, the second tenon 318b of the first segment 302 may be coupled by the seal 312 to the first tenon 320a of the second segment 304. The seal 312 may thus couple or clamp the first segment 302 to the second segment 304 to form the outer annular structure 306.

The seal 322 may similarly couple or clamp the fourth tenon 318d of the first segment 302 to the third tenon 320c of the second segment 304. Thus, a plurality of seals (e.g., 312 and 322) may couple a plurality of segments (both with respect to their respective inner annular structures and outer annular structures) to form a substantially annular duct or MTF 112.

Figure 5:
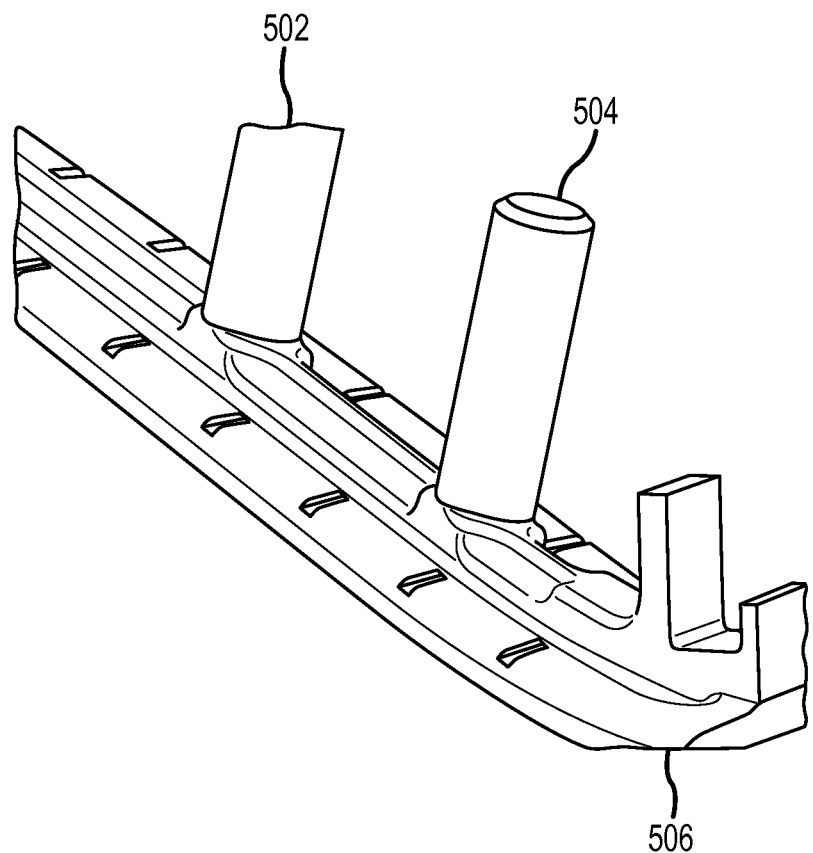
FIG. 5 illustrates, in accordance with various embodiments, a perspective view of a portion of a seal.

A seal 312 (see, e.g., FIG. 4) may comprise a first (male) member 402 and a second (female) member 404. In various embodiments, the first member 402 may comprise a plurality of substantially "T-shaped" elements, for example, element 502 and element 504 (with brief reference to FIG. 5), arranged and coupled axially along an axial member or body 506 (as shown with respect to FIG. 5) while the second member 404 may comprise an axial member configured to receive each of the plurality of the elements (e.g., 502, 504, etc.) For example, as shown with respect to FIG. 4, a T-shaped element 502 may extend radially through the second member 404. Thus, in various embodiments, the second member 404 may comprise a "T-shape" (or two back to back "L-shapes") as well, where the second member 404 receives the first member 402.

Figure 6:
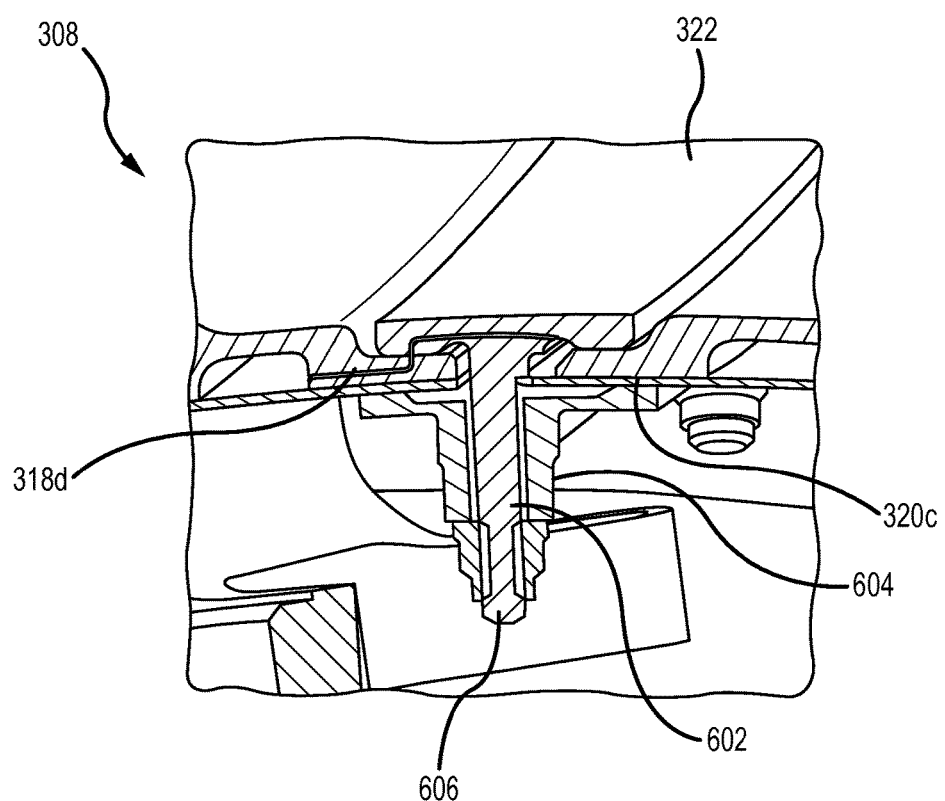
FIG. 6 illustrates, in accordance with various embodiments, a cross-sectional view of an inner annular structure of an MTF.

With reference to FIG. 6, a seal 322 is shown coupling the fourth tenon 318d of the first segment 302 to the third tenon 320c of the second segment 304. As discussed above, the seal 322 may comprise a first (male) member 602 and a second (female) member 604. In various embodiments, the first member 602 may comprise a plurality of substantially "T-shaped" elements (e.g., element 606 arranged and coupled axially along an axial member or strut while the second member 604 may comprise an axial member configured to receive each of the plurality of the elements (e.g., 606). For example, a T-shaped element 606 may extend radially through the second member 604. In various embodiments, the second member 604 may comprise a "T-shape" (or two back to back "L-shapes") as well, where the second member 604 receives the an element 606 of the first member 602. In various embodiments, elements 502 and/or 504 and/or member 602 may be threaded, such that an element 502 and/or 504 may, for example, be threaded onto member 602 in a nut and bolt like fashion.

With returning attention to FIG. 3, each of the outer annular structure 306 and/or inner annular structure 308 may be overlaid by (and/or coupled to, via, e.g., the seal 312 and/or 322) to a perforated structure 324 (as shown with respect to the outer annular structure 306). The perforated structure 324 may comprise an arced surface that conforms or substantially conforms to the arc of the inner and/or outer annular structures 306 and/or 308. The perforated structure may further comprise any of a variety of temperature resistant materials and/or alloys. For example, a perforated structure may comprise at least one of nickel, stainless steel, and one or more other metal alloys such as an austenitic nickel chromium alloy (as sold under the trademark INCONEL). Perforations of perforated structure 324 may be manufactured by any suitable process. For example, perforated structure 324 may be forged or cast. In various embodiments, perforations in perforated structure 324 may be drilled or otherwise machined.

In operation, it may be beneficial to cool the equipment, as described above, that passes through the vanes 310a and 310b. As described, these vanes may pass through the MTF 112 duct, through which combustion gasses may flow at high velocity and temperature. Thus, to maintain the integrity of the components within the vanes, cooling may be required.

To achieve this result, cooling air may be pumped in from, for example, an outer portion of the MTF 112, such that it impinges on the perforated structure 324. As may be understood, cooling air may also be received from other locations of a gas turbine engine and/or a nacelle that surrounds the gas turbine engine. Cooling air that is under pressure may impinge perforated structure 324 and permeate through the various perforations (due to a difference in pressure) to cool each of the first segment 302 and second segment 304 of the outer annular structure 306.

Figure 7:
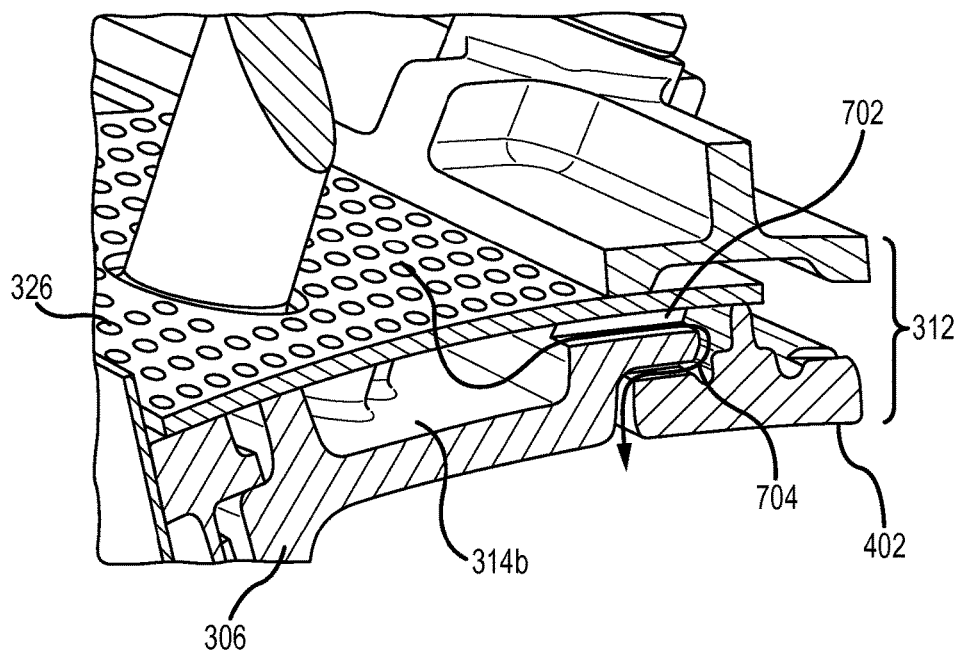
FIG. 7 illustrates, in accordance with various embodiments, a cross-sectional view of an outer annular structure of an MTF, wherein air impinges on a perforated structure to flow through a channel, slot, and/or gutter to reach a duct.

With reference to FIG. 7, as air impinges on the outer annular structure 306, the air may be channeled through the channel 314b (and/or 314a, not shown). The air may be further transferred to the seal 312 by way of a slot 702 formed in each of the first segment 302 and second segment 304 of the outer annular structure 306. These channels 314b (and/or 314a) may help to cool the seal 312 itself, and, in various embodiments, the air may pass through tortuous gutters 704 in the seal 312 to enter to the hot gas flow path within the duct of the MTF 112. In various embodiments, the tortuous gutters 704 may be at least partially formed by a narrow passage that exists between the first male member 402 of the seal 312, the tenon 318a, and the perforated structure 324, which collectively form a passage through which air may flow. Air may further pass through channels formed in the vanes 310a and 310b themselves (not shown) to reach the channels 314c and 314d. Air may be received by the seal 322 (not shown) through a variety of slots, as described above, such that it travels through tortuous gutters in the seal 322 to enter, again, the hot gas flow path of the duct of the MTF 112. The perforations of perforated structure 324 and the tortuous gutters 704 provide modulation of radially inward flowing cooling air.

Figure 8:
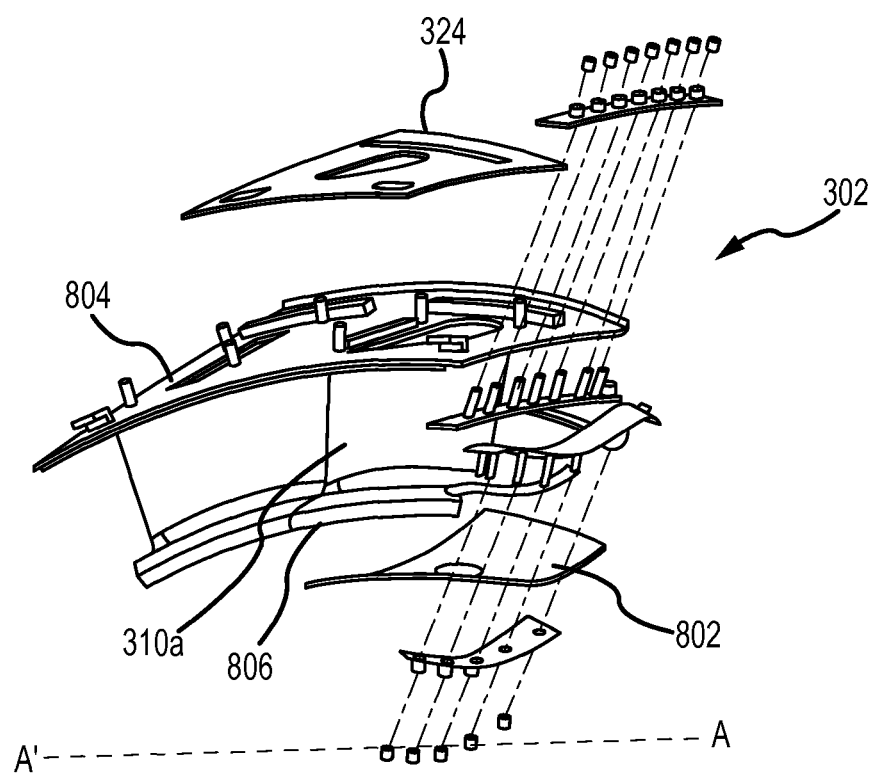
FIG. 8 illustrates, in accordance with various embodiments, an exploded view of a first segment.

With reference to FIG. 8, first segment 302 is shown. Perforated structure 324 is shown separated from first segment 302 proximate radially outward segment portion 804.

Perforated structure 802 is also shown apart from first segment 302 proximate radially outward segment portion 804. During manufacture, perforated structure 324 and perforated structure 802 may be joined to first segment 302. In that regard, perforated structure 324 may be attached to a radially outward portion of first segment 302 and perforated structure 802 may be attached to a radially inward portion of first segment 302. In that regard, both perforated structure 324 and perforated structure 802 may allow for cooling air to permeate therethrough and provide cooling to, for example, vane 310a.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus, comprising:
   a radially inward segment portion;
   a radially outward segment portion;
   a radially outward perforated structure coupled to the radially outward segment portion;
   a seal comprising a first member and a second member, at least a portion of the radially outward segment portion is disposed radially between the first member and the second member; and
   a slot proximate to the seal, the slot configured to relay cooling air through the seal and into a hot gas path,
   wherein the slot is formed in the radially outward segment portion, and
   wherein the second member of the seal comprises a threaded female member threaded onto a threaded male member of the first member whereby the first member is coupled to the second member.

2. The apparatus of claim 1, wherein a vane extends from the radially inward segment portion to the radially outward segment portion.

3. The apparatus of claim 2, further comprising a radially inward perforated structure coupled to the radially inward segment portion.

4. The apparatus of claim 2, wherein the vane defines a channel.

5. The apparatus of claim 2, wherein the segment at least partially defines a hot gas path between a high pressure turbine ("HPT") and a low pressure turbine ("LPT").

6. The apparatus of claim 1, wherein the radially inward segment portion and the radially outward segment portion comprise a segment, the segment comprises a first tenon that defines a first axial terminus of the segment and a second tenon that defines a second axial terminus of the segment.

7. The apparatus of claim 6, wherein the seal clamps a second segment to the segment.

8. The apparatus of claim 1, further comprising a tortuous gutter.

9. The apparatus of claim 8, wherein the tortuous gutter comprises a narrow passage between the seal, a first tenon of the segment, and the perforated structure.

10. The apparatus of claim 1, wherein the radially outward perforated structure comprises a temperature resistant alloy.

11. The apparatus of claim 1, wherein at least a portion of the radially outward perforated structure is disposed radially between the first member and the second member, the radially outward perforated structure is coupled to the radially outward segment portion via the seal.

12. The apparatus of claim 1, wherein the radially outward perforated structure and the radially outward segment are clamped between the first member and the second member.

13. The apparatus of claim 12, wherein the radially outward perforated structure is clamped radially between the second member and the radially outward segment, and the radially outward segment is clamped radially between the radially outward perforated structure and the first member.

* * * * *